US008451900B2

(12) United States Patent
Hofman (10) Patent No.: US 8,451,900 B2
(45) Date of Patent: May 28, 2013

(54) SYSTEM AND METHOD FOR GLOBAL MOTION ESTIMATION USING PROFILE MATCHING

(75) Inventor: Paul M. Hofman, Nuenen (NL)

(73) Assignee: Entropic Communications, Inc., San Diego, CA (US)

( * ) Notice: Subject to any disclaimer, the term of this patent is extended or adjusted under 35 U.S.C. 154(b) by 1060 days.

(21) Appl. No.: 12/304,336

(22) PCT Filed: Jun. 12, 2007

(86) PCT No.: PCT/IB2007/052222
§ 371 (c)(1),
(2), (4) Date: Dec. 11, 2008

(87) PCT Pub. No.: WO2007/148260
PCT Pub. Date: Dec. 27, 2007

(65) Prior Publication Data
US 2009/0153742 A1   Jun. 18, 2009

(30) Foreign Application Priority Data

Jun. 19, 2006   (EP) ..................................... 06115665

(51) Int. Cl.
*H04N 7/12*   (2006.01)
(52) U.S. Cl.
USPC ..................... 375/240.16; 348/699
(58) Field of Classification Search
USPC ...................... 375/240.16; 348/699
See application file for complete search history.

(56) References Cited

U.S. PATENT DOCUMENTS
5,727,078 A   3/1998 Chuopeau

FOREIGN PATENT DOCUMENTS

| JP | 3775683 B2 | 5/2006 |
|---|---|---|
| JP | 2006-014121 A | 12/2006 |
| WO | 9409592 | 4/1994 |

OTHER PUBLICATIONS

Yido Koo and Wonchan Kim, "An Image Resolution Enhancing Technique Using Adaptive Sub-Pixel Interpolation for Digital Still Camera System", Feb. 1999, IEEE Transactions on Consumer Electronics, vol. 45, No. 1, pp. 118-123.*
Ealgoo Kim; Daeyun Shim; Seongik Jang; Gyudong Kim; Wonchan Kim; , "A global motion characterization method using one-dimensional characteristic curves for image processing applications," Jun. 1997, 1997 IEEE International Symposium on Circuits and Systems, Jun. 9-12, 1997, Hong Kong, vol. 2, 9-12, pp. 1393-1396.*

(Continued)

*Primary Examiner* — Sath V Perungavoor
*Assistant Examiner* — James Pontius
(74) *Attorney, Agent, or Firm* — Bruce Greenhaus; Richard Bachand; Duane Morris LLP (57) ABSTRACT

In a global motion estimation, profiles (Prof1, Prof2, ProO, Prof4) are determined of frames (FR1, FR2, FR3, FR4) of an input video signal. Each profile comprises a value, for each pixel in a first direction of the frame, which is obtained by combining pixels in a second direction of the frame. The profiles are updated (Upd Prof) with a first shift ($\Delta x'_{12}$, $\Delta x'_2$, $\Delta x'_{34}$) to obtain updated profiles (Prof1', Prof2', Pro3'), and the updated profiles are matched (S/M) to obtain a secondary shift ($\Delta x'_{12}$, $\Delta x'_{23}$). Preferably, the first shift is a zero shift. The updating may be effected by shifting one of the profiles over the first shift to obtain a shifted profile, and subtracting another one of the profiles from the shifted profile. If the second direction is the vertical direction, the profile may comprise a vertically combined (e.g. averaged) pixel value for each pixel in the horizontal direction.

9 Claims, 8 Drawing Sheets

OTHER PUBLICATIONS

Bosco, A.; Bruna, A.; Battiato, S.; Bella, G.; Puglisi, G.; , "Digital video stabilization through curve warping techniques," May 2008, Consumer Electronics, IEEE Transactions on Consumer Electronics, vol. 54, No. 2, pp. 220-224.*

Min-Kyu Kim; Ealgoo Kim; Daeyun Shim; Seong-Ik Jang; Gyudong Kim; Wonchan Kim; , "An efficient global motion characterization method for image processing applications," Nov. 1997, Consumer Electronics, IEEE Transactions on Consumer Electronics, vol. 43, No. 4, pp. 1010-1018.*

Zeljkovic et al., "Motion Detection Based Multimedia Supported Intelligent Video Surveillance System", Jun. 2006, 48th International Symposium ELMAR-2006, 07-09, pp. 49-52.*

Osian et al., "Video shot characterization", Jun. 8, 2004, Machine Vision and Applications (2004) 15, pp. 172-177.*

Kim M-K, et al; "An Efficient Global Motion Characterization Method for Image Processing Application"; IEEE Transactions on Consumer Electronics; New York, NY, USA; vol. 43, No. 4, Nov. 1, 1997; pp. 1010-1017, XP000768553; ISSN: 0098-3063.

Ratakonda, K; "Real-Time Digital Video Stabilization for Multi-Media Applications"; Circuits and Systems, 1998, ISCAS '98; Proceedings of the 1998 IEEE International Symposium on Monterey, CA, USA, May-Jun. 1998; New York, NY, USA,; IEEE; US, vol. 4; May 31, 1998; pp. 69-72; XP010289419; ISBN: 0-7803-4455-3.

Sauer, Ken, et al; "Efficient Block Motion Estimation Using Integral Projections"; IEEE Transactions on Circuits and Systems for Video Technology, IEEE Service Center, Piscataway, NJ, US; vol. 6, No. 5, Oct. 1996; XP011014326; ISSN: 1051-8215.

Joon-Seek Kim, et al; "A Fast Feature-Based Block Matching Algorithm Using Integral Projections"; IEEE Journal on Selected Areas in Communications, IEEE Service Center, Piscataway, NJ, US; vol. 10, No. 5; Jun. 1, 1992; pp. 968-971; XP000276102; ISSN: 0733-8716.

Zeljkovic, V, et al; "Motion Detection Based Multimedia Supported Intelligent Video Surveillance System"; Applied Mathematics Research Center, Delaware State University, Dover, DE, USA, 2006.

Osian, Mihai, et al; "Video Shot Characterizaiton", Katholieke Universiteit Leuven, ESAT/PSI, Leuven, Belgium; pp. 1-12, 2004.

Norbert O. Stoffler et al., An Image Processing Board with an MPEG Processor and Additional Confidence Calculations for Fast and Robust Optic Flow Generation in Real Environments. In Proc. 1997 Int. Conf. on Advanced Robotics (ICAR'97), 845-850, 1997.

* cited by examiner

SYSTEM AND METHOD FOR GLOBAL MOTION ESTIMATION USING PROFILE MATCHING

FIELD OF THE INVENTION

The invention relates to a method and device for global motion estimation.

BACKGROUND OF THE INVENTION

Motion estimation in general, and global motion estimation in particular, is a common field of activity within video processing. Global motion estimation usually serves as an enabling technology to a wide variety of algorithms, such as temporal interpolation and camera stabilization. Global motion estimation is sometimes used as a cost-effective alternative to block/pixel accurate motion estimation.

A fundamental problem in global motion estimation is to distinguish between global and non-global motion. Global motion estimation assumes that all motion in an image can be summarized in a few parameters. When the assumption of global motion estimation does not hold, then a global motion estimation will come up with unreliable answers, as it is designed to come up with a simple answer, one that does not explain, say, a globally moving scene with one or more independently moving objects in it.

Problems that are not yet satisfactorily solved relate to whether global motion estimation can be used to reliably find background motion in the presence of foreground objects, whether global motion estimation can be used to estimate the motion of the foreground objects, and how to know when the motion is global.

SUMMARY OF THE INVENTION

It is, inter alia, an object of the invention to provide improved global motion estimation. The invention is defined in the independent claims. Advantageous embodiments are defined in the dependent claims.

In a global motion estimation in accordance with the present invention, profiles are determined of frames of an input video signal. Each profile comprises a value, for each pixel in a first direction of the frame, which is obtained by combining pixels in a second direction of the frame. The profiles are updated with a first shift to obtain updated profiles, and the updated profiles are matched to obtain a second shift. Preferably, the first or second shift is a zero shift. This is particularly advantageous at removing static structures such as subtitles or other on-screen graphics which remain static between frames. The zero shift can be automatically applied at one of the stages of the method or the method can test for the presence of a minimum in the difference between profiles at a zero value of shift before applying the zero shift to the profiles. More generally, the first shift is obtained by matching the profiles of mutually different frames. The updating may be effected by shifting one of the profiles over the shift to obtain a shifted profile, and subtracting another one of the profiles from the shifted profile. If the second direction is the vertical direction, the profile may comprise a vertically combined (e.g. averaged) pixel value for each pixel in the horizontal direction. Pairs of updated profiles can be compared in the same manner, at different values of shift, to find a shift which results in minimal error.

One aspect of this invention presents a way to use simple global motion estimation in an iterative way to reliably estimate the background motion in the presence of foreground objects, and also to estimate the motion of the foreground objects in the video, i.e. to find foreground objects in addition to the larger background.

Another aspect of this invention presents a way to quantify the quality of solutions found by the global motion estimation, so that one can judge how global the solution is, or how prominent an additional foreground object is present.

In an embodiment of the invention, profile matching is applied. For each horizontal position separately, vertically averaged pixel values (thus averaging all video lines) are determined. In this manner, a horizontal profile is created for each frame. Such a horizontal profile can be used to detect a horizontal shift by comparing the profile of one frame with respect to another, e.g. by determining a mean absolute difference for each possible shift: the shift at which the minimum difference occurs represents the (main) horizontal shift. In a similar manner, vertical profiles can be obtained by horizontally averaging all pixels of a line, which vertical profile can be used to detect a vertical shift or vertical motion component. So, to obtain both horizontal and vertical motion components, the invention is carried out twice. Clearly, instead of averaging, another operation like adding may be used.

In accordance with an aspect of the invention, to determine a secondary shift, a residue is computed by subtracting the profiles at the optimal shift, thus eliminating the first solution from the data. Then the secondary shift can be found by matching the residual profiles, using the same matching procedure as used to determine the main shift.

Preferably, once the secondary shift has been determined, the original profiles are updated with the secondary shift, and the main shift is estimated again. In this manner it is possible to obtain a more accurate estimate for the main shift, as the data are no longer polluted by the secondary shift.

In an embodiment, zero motion components (static structures like subtitles) are eliminated first, where after background motion can be reliably detected. Static structures are common issues in TV images, which advocates checking the presence of a zero shift always, as the additional computational costs seem limited. The second stage global motion detection then comes down to matching profiles of frame differences.

The frames that are operated on can be directly adjacent to one another in the video signal. For example, if an input video signal has frames numbered 1, 2, 3 ... the method can operate on frames 1 and 2, frames 2 and 3, etc. However, the frames that are operated on could be more widely spaced within the input video signal, such as every fourth or eighth frame. The temporal spacing of the frames that are operated upon will be based on factors such as the processing resources available to perform the method and the speed of motion to be estimated.

The functionality of this invention can be implemented in software, hardware or a combination of these. The invention can be implemented by means of hardware comprising several distinct elements, and by means of a suitably programmed processor. Accordingly, another aspect of the invention provides software comprising instructions (code) which, when executed by a computer or processor, implements the method. The software may be tangibly embodied on an electronic memory device, hard disk, optical disk or other machine-readable storage medium or it may be downloaded to a processing device via a network connection.

These and other aspects of the invention will be apparent from and elucidated with reference to the embodiments described hereinafter.

DETAILED DESCRIPTION OF EMBODIMENTS

Figure 1:
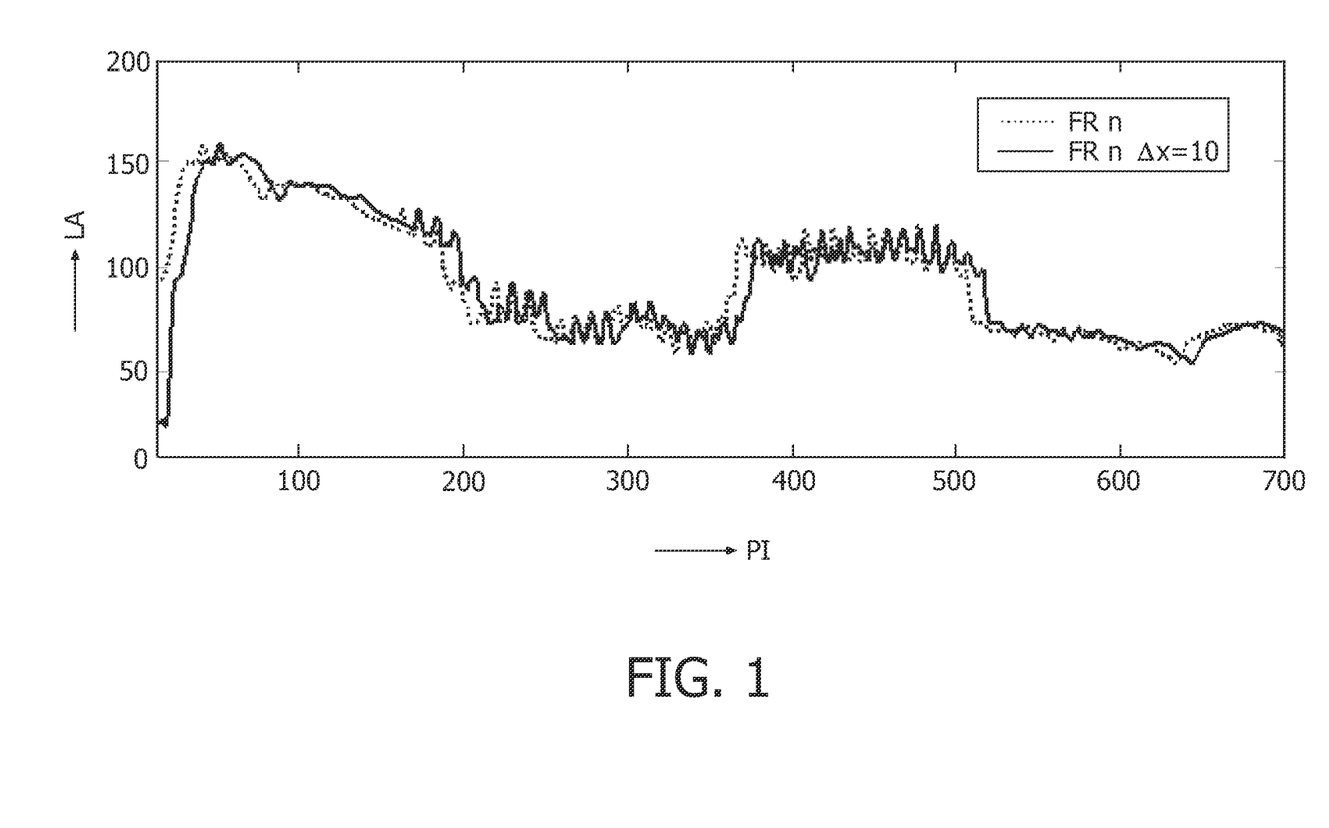
FIG. 1 shows profiles of line-averaged pixel value for two frames mutually shifted by 10 pixels.

FIG. 1 shows profiles (line average LA vs. pixel index PI) of line-averaged pixel value for two frames mutually shifted by 10 pixels. The first frame is represented by a dotted line, whereas the second frame is represented by a solid line. The curves are identical, apart from a horizontal shift by 10 pixels.

Figure 2:
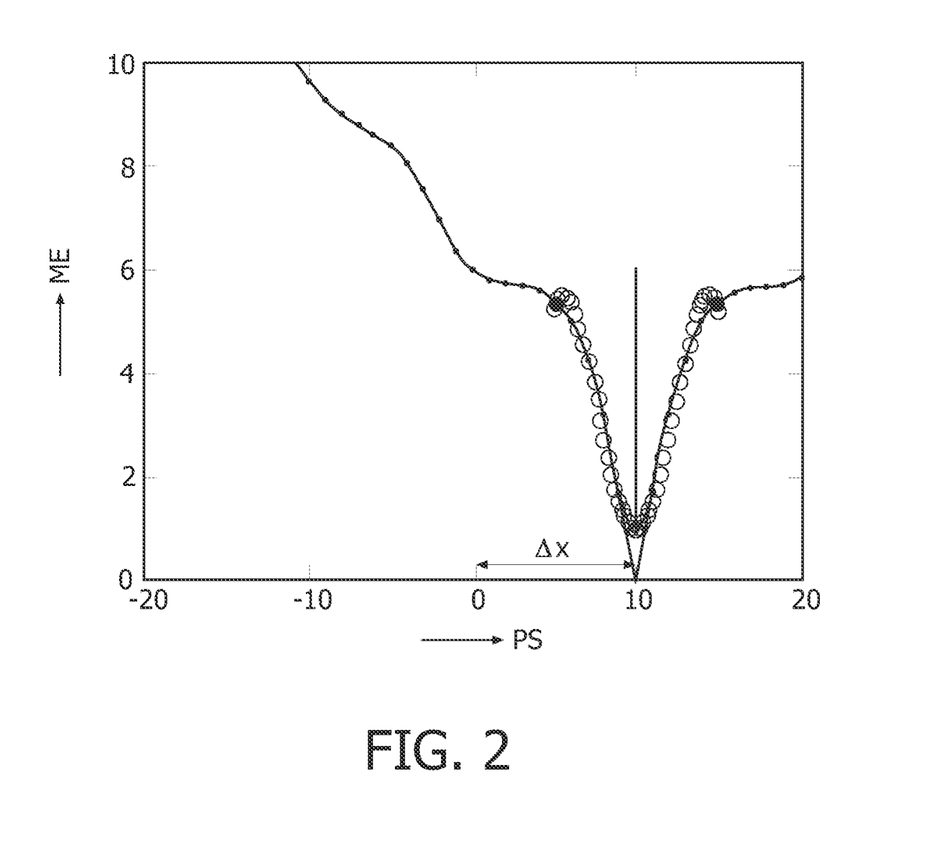
FIG. 2 shows the match error between the two profiles of FIG. 1.

FIG. 2 shows the match error ME between the two profiles of FIG. 1 (as a mean-absolute difference) as a function of the horizontal pixel shift PS from the first frame relative to the second frame. The match error is zero at a pixel shift ($\Delta x$) of precisely 10 pixels. Furthermore, the match error exhibits a well-defined sharp profile and thus a clear global minimum of the match error.

Figure 3:
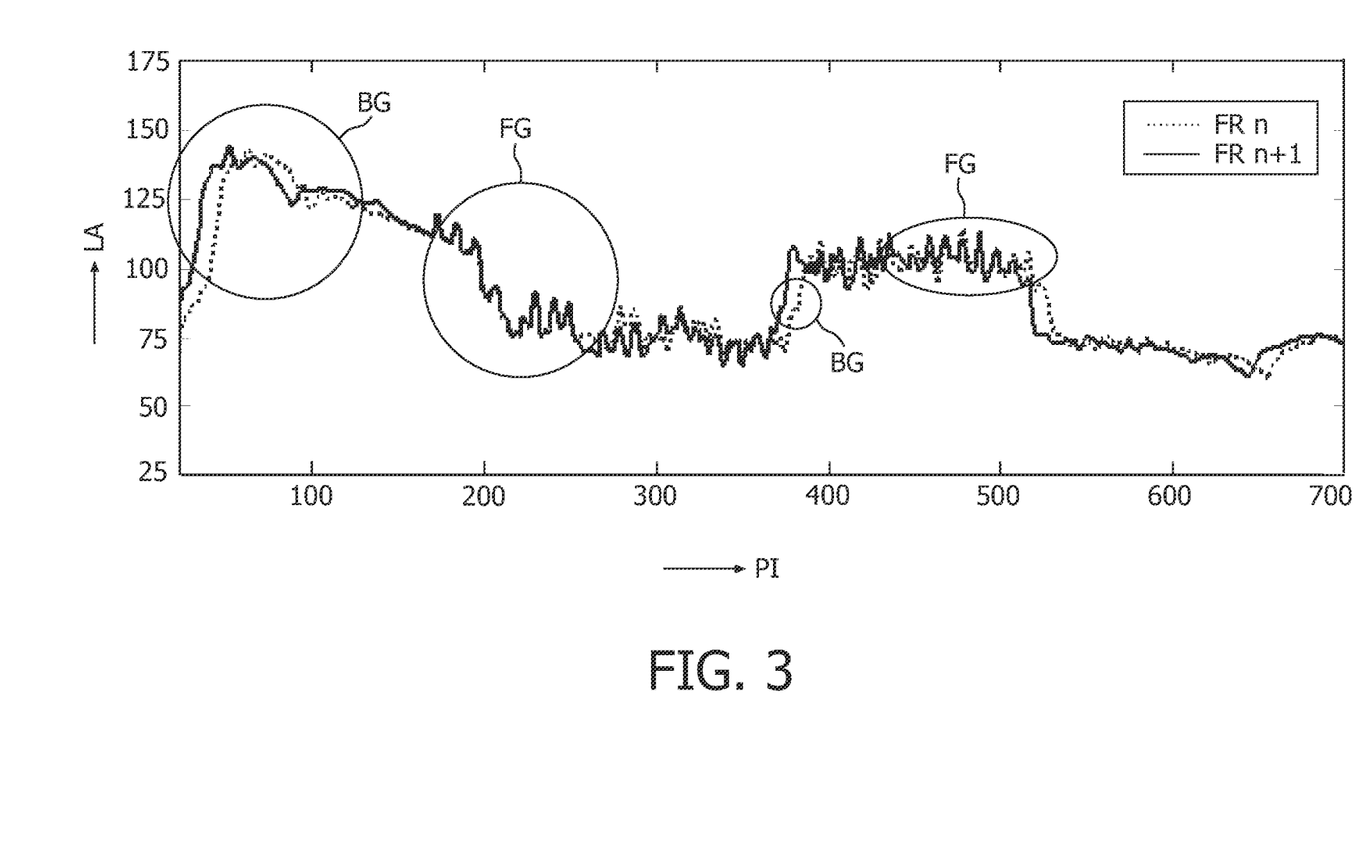
FIG. 3 shows profiles of two subsequent frames in a real scene.

FIG. 3 shows profiles (line average LA vs. pixel index PI) of two subsequent frames (frame FR n shown with a dotted line, and frame FR n+1 shown with a solid line) in a real scene with a rightward moving background BG, and a static foreground FG, dominated by high-contrast edges of subtitles. In this case, one can see portions of the profiles that coincide (indicating no horizontal motion), whereas other portions do not coincide but seem shifted by about 10 pixels. Here there are, at least, two solutions, rather than only one to the global (horizontal) motion.

Figure 4:
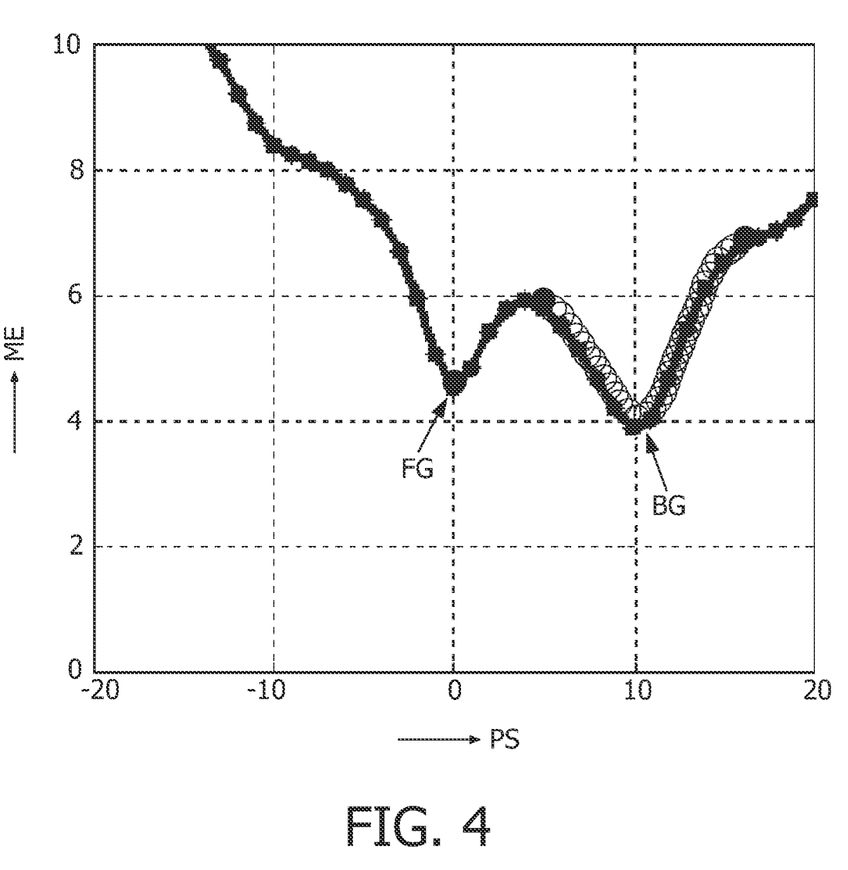
FIG. 4 shows the match error as a function of the pixel shift for the case of FIG. 3.

FIG. 4 shows the match error ME as a function of the pixel shift PS for the case of FIG. 3. Note that this curve shows two minima: a global minimum caused by the background motion at +10 pixels (BG), and a local minimum caused by the static foreground at 0 pixels (FG). Thus, in contrast to FIG. 2, this profile does not define a single sharp and clear minimum.

Figure 5:
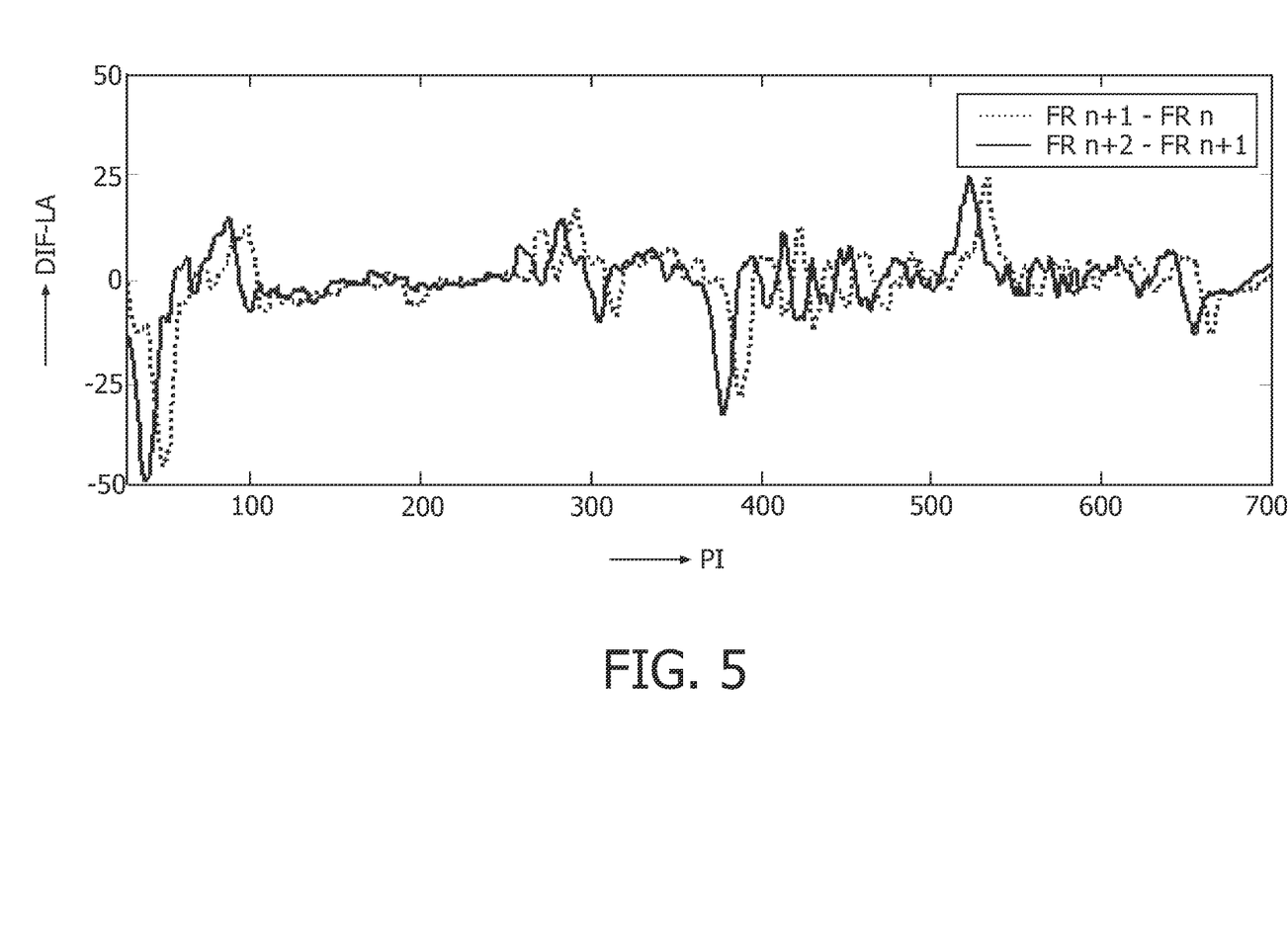
FIG. 5 shows residuals of the profiles shown in FIG. 3.

FIG. 5 shows residuals (differential line average DIF-LA vs. pixel index PI) of the profiles shown in FIG. 3. The first solution, at a shift of $\Delta x=0$ pixels, has been eliminated by subtracting the profiles of consecutive frames. The dotted line shows the residual profile of two frames, say frame FR n and frame FR n+1, whereas the solid line shows the residual profile of the next frame pair, i.e. frame FR n+1 and frame FR n+2. Note that, in contrast to the profiles in FIG. 3, the residual profiles are very similar in shape and differ only by a horizontal shift.

Figure 6:
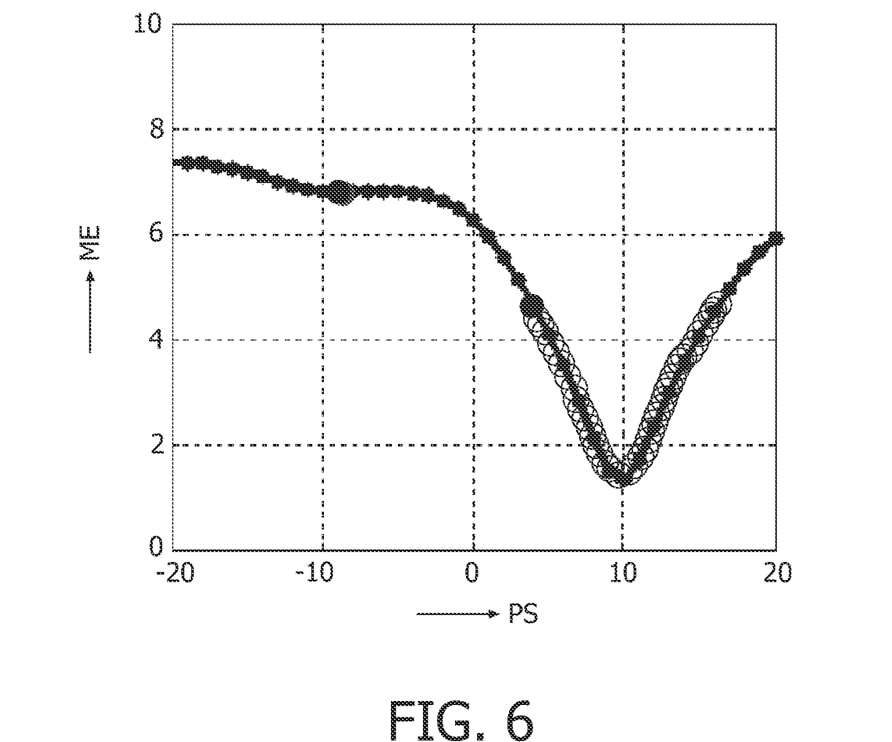
FIG. 6 shows the match error as a function of the pixel shift of the residual profile of FIG. 5.

FIG. 6 shows the match error ME as a function of the pixel shift PS of the residual profile of FIG. 5. Compared to FIG. 4, the solution at shift $\Delta x=0$ has been subtracted from the profiles. Matching of the residuals now clearly shows the second solution at a well-defined minimum at $\Delta x$ being about 10 pixels. See also the match error ideal for 'pure' global motion in FIG. 2.

Figure 7:
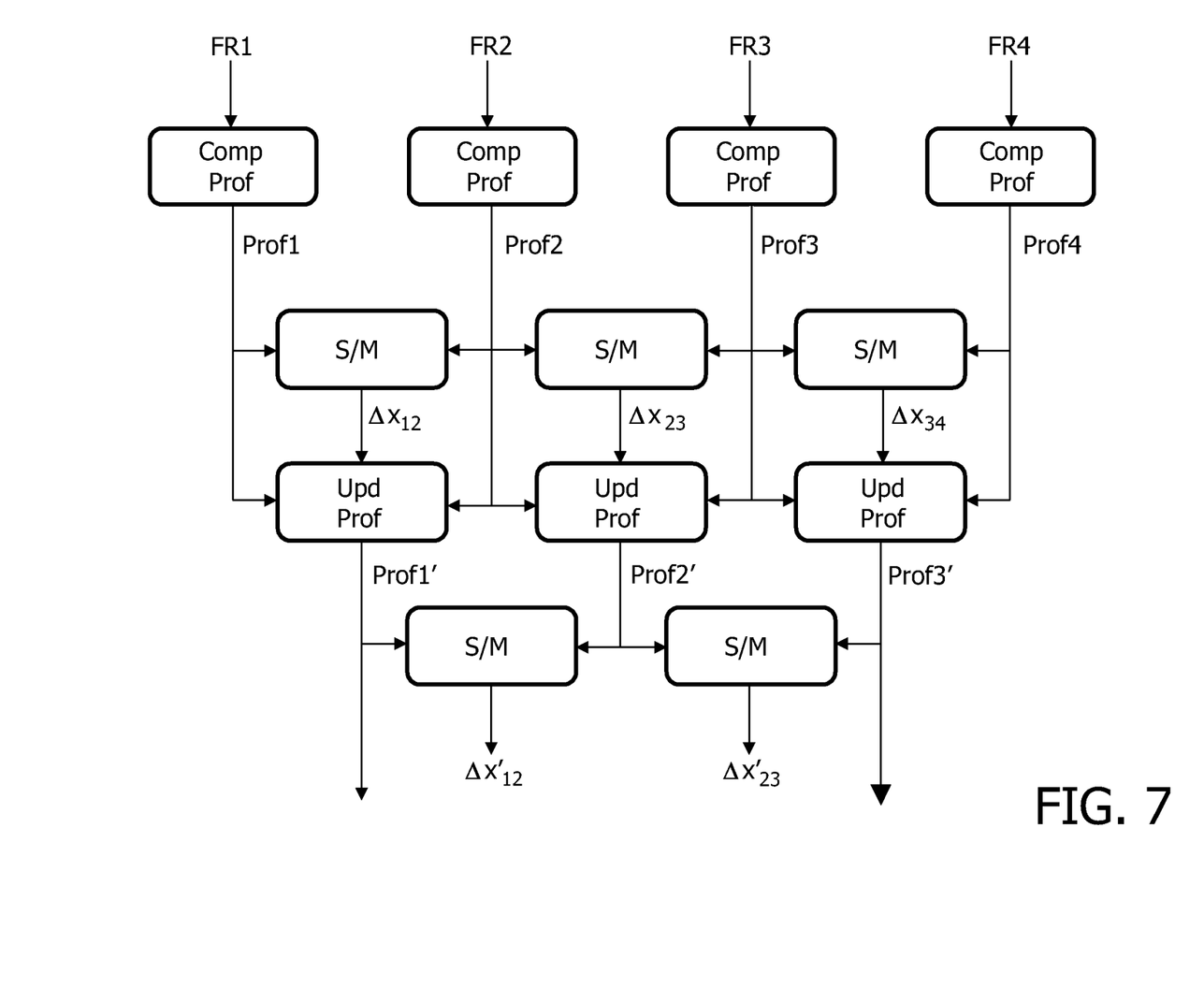
FIG. 7 shows a block diagram of the iterative matching procedure.

FIG. 7 shows a flowchart of the iterative matching procedure. Consecutive frames FR1, FR2, FR3, FR4 serve as the initial input for computation (Comp Prof) of profiles (Prof1/Prof2/Prof3/Prof4). Next, the profiles are compared in shift/matching operations S/M, resulting in an optimal match and corresponding shifts $\Delta x_{12}$, $\Delta x_{23}$ and $\Delta x_{34}$. On the third row from the top, the profiles are updated in update profile operations Upd Prof: the profiles are subtracted from each other after being shifted by the optimal shift $\Delta x_{12}$, $\Delta x_{23}$ and $\Delta x_{34}$. Finally, the updated profiles are matched in a second shift/matching operation S/M resulting a second solution, thus a second set of optimal shifts $\Delta x'_{12}$ and $\Delta x'_{23}$. In theory, this process can be repeated until all solutions are found. For each additional iteration the block diagram is extended downward by adding a further row of Update Profile (Upd Prof) operations and shift/matching operations (S/M).

Figure 8:
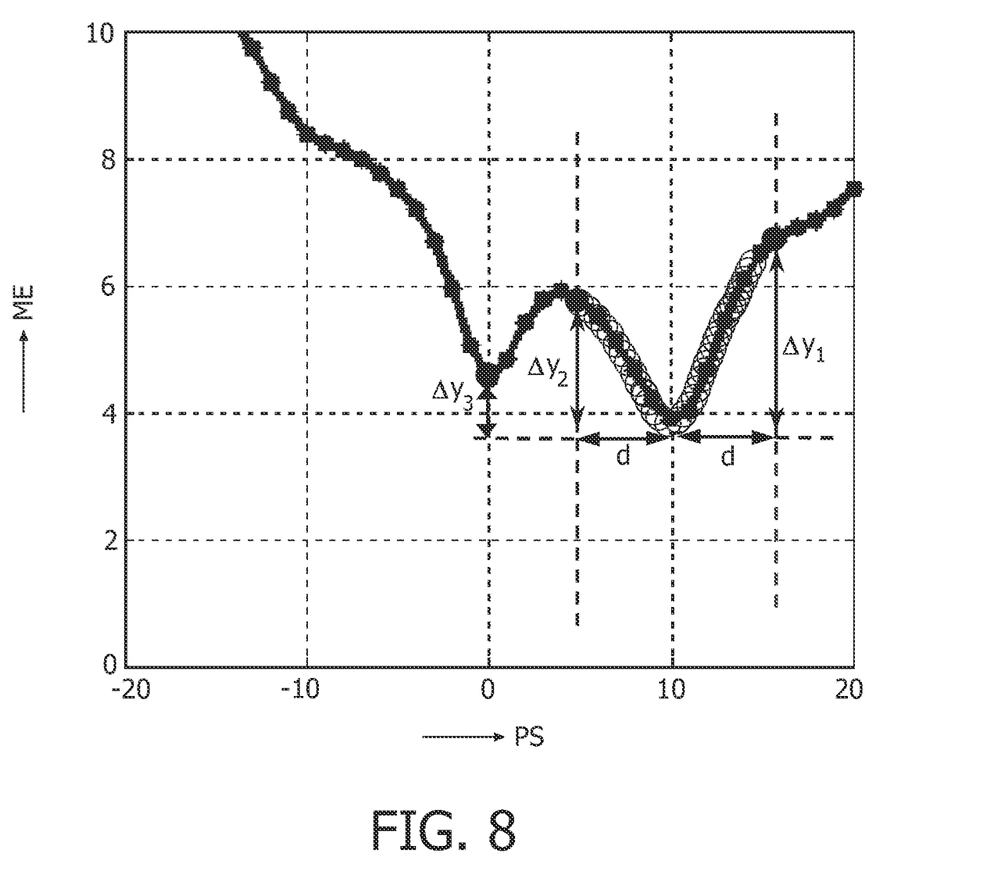
FIG. 8 illustrates a confidence metric.

A confidence metric may be applied to quantify the quality of the solution (i.e. of the minimum), and to decide whether to accept/discard global motion vectors that result from the proposed method. The metric expresses that confidence is high if the global minimum is well defined (i.e. is the minimum value a 'sharp dip'?) and that local minima are not prominent. To illustrate the confidence metric, FIG. 8 shows a plot of match error (ME) vs. pixel shift (PS) graph. Firstly, the height of the response is examined at pixel shifts which are offset by the values ±d from the position of the global minimum (positioned at a shift PS=10 pixels). The vertical distances $\Delta y1$, $\Delta y2$ at these ±d points should be large if the minimum is sharply defined. Secondly, the height of any other minimum points ($\Delta y3$) is examined. The height of these other local minimum points should be large. The minimum of these 3 values can be remapped to a range [0.1], resulting in a confidence metric, with 0 meaning 'no confidence' and 1 meaning 'full confidence'. Alternatively, some other operation can be performed based on one or more of these values. In this example, the confidence would be low as the local minimum is too prominent (i.e. $\Delta y3$ is too small).

The confidence metric can also be used to select a shift value. During the shift/matching operation, a value of match error is obtained for a range of possible shift values, as shown in FIG. 4. The graph of match error vs. shift value may have multiple possible minima. A confidence metric can be calculated for each of the possible minima and the confidence metrics can be used to select the 'best' quality minima and the shift value corresponding to that minima. That shift value is then used when subsequently updating the profiles.

A preferred embodiment of the invention can be summarized as follows. Match profiles by shifting, which results in a first solution at minimum match error. Then update the profile by subtracting profiles after shifting with the first solution. Then match the updated profiles by shifting to obtain a second solution at minimum match error. The quality of both solutions is calculated using a confidence metric ('is the minimum a well-defined minimum?'). This scheme enables finding foreground objects in a predominantly (# pixels=large) background scene, which occurs often e.g. when an object/actor is being followed by the camera, thus being static on the camera image, yet creating background movement on the acquired video.

In a special case thereof, the algorithm first updates the profiles by subtracting profiles with zero shift (i.e. to eliminate static structures). Then match updated profiles by shifting to find any solution. The quality of both solutions is calculated using a confidence metric. This special case is a meaningful, easier case. Static structures are common issues in TV images, which advocates checking the presence of a zero shift always, as the additional computational costs seem limited. Although it is preferred to apply the zero shift first, to remove static structures, the zero shift can alternatively be used at the second stage of updating the profiles.

In the flowchart of FIG. 7, the method proceeds in the downward direction to determine first, second, third etc. shift values. At each stage, updated profiles are used. In an alternative embodiment of the invention, once the second shift has been determined, the original profiles (i.e. the profiles of FR1, FR2, FR3) are updated with the second shift value. That is, one of the original profiles is shifted by the second shift value, and then subtracted from another of the original profiles. This has the effect of removing the secondary motion (the second shift value). The updated profiles resulting from this operation are then compared at varying shift values to determine a shift value that gives a minimum in a difference between the updated profiles. This minimum should represent the main shift due to global motion. This embodiment has an advantage that it is possible to determine the main shift with greater accuracy, since the data in the updated profiles is no longer polluted by the secondary motion.

It should be noted that the above-mentioned embodiments illustrate rather than limit the invention, and that those skilled in the art will be able to design many alternative embodiments without departing from the scope of the appended claims. The notion of a 'frame' includes the notion of a 'field'. This specification may be used to program a video processor for use in a television set or other video signal-processing device to obtain an enhanced video signal. Such an enhanced video signal may have an increased number of fields per second in comparison with the input video signal, or may be a non-interlaced version of an interlaced input video signal, or may have been subjected to processing to eliminate artifacts resulting from a film-to-video signal conversion, or may have been compensated for unintended hand-held camera movements. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention may be implemented by means of hardware comprising several distinct elements, and/or by means of a suitably programmed processor. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A method of global motion estimation, comprising the steps of:
   determining profiles of frames of an input video signal, wherein each profile comprises a value, for each pixel in a first direction of the frame, which is obtained by combining pixels in a second direction of the frame;
   comparing profiles of frames by shifting a profile of one frame with respect to a profile of another frame to determine at least one first shift value where a minimum in a difference between profiles occurs;
   updating the profiles by shifting one of the profiles by using one of the determined first shift values representing a pixel shift in the first direction and subtracting another one of the profiles from the shifted profile to obtain updated profiles; and
   comparing updated profiles to obtain at least one second shift value where a minimum in a difference between updated profiles occurs,
   wherein a plurality of possible first shift values are determined and a confidence metric is used for each of the possible first shift values to select the first shift value that is used in the step of updating the profiles.

2. A method according to claim 1 further comprising calculating a confidence metric for a shift value obtained when comparing profiles of frames.

3. A method according to claim 2 wherein the confidence metric is based on at least one of:
   the sharpness of the response at the position of the shift value;
   other minimum values.

4. A method according to claim 2 further comprising using the confidence metric to quantify the quality of the shift value.

5. A method as claimed in claim 1, further comprising the steps of:
   updating the profiles with the second shift value to obtain second updated profiles, and
   comparing the second updated profiles to obtain an improved estimate of the first shift value.

6. A method as claimed in claim 1, further comprising iteratively performing the comparing and updating steps to identify other shift values.

7. A method as claimed in claim 1, wherein the first shift value or the second shift value is a zero shift.

8. A method as claimed in claim 1 wherein the second direction is the vertical direction, and the profile comprises a vertically combined pixel value for each pixel in the horizontal direction.

9. A method as claimed in claim 1, further comprising repeating the method by determining a second set of profiles of frames of an input video signal wherein each profile comprises a value, for each pixel in the second direction of the frame, which is obtained by combining pixels in the first direction of the frame and performing the steps of comparing the profiles and updating the profiles using the second set of profiles.

* * * * *